Figure 1:
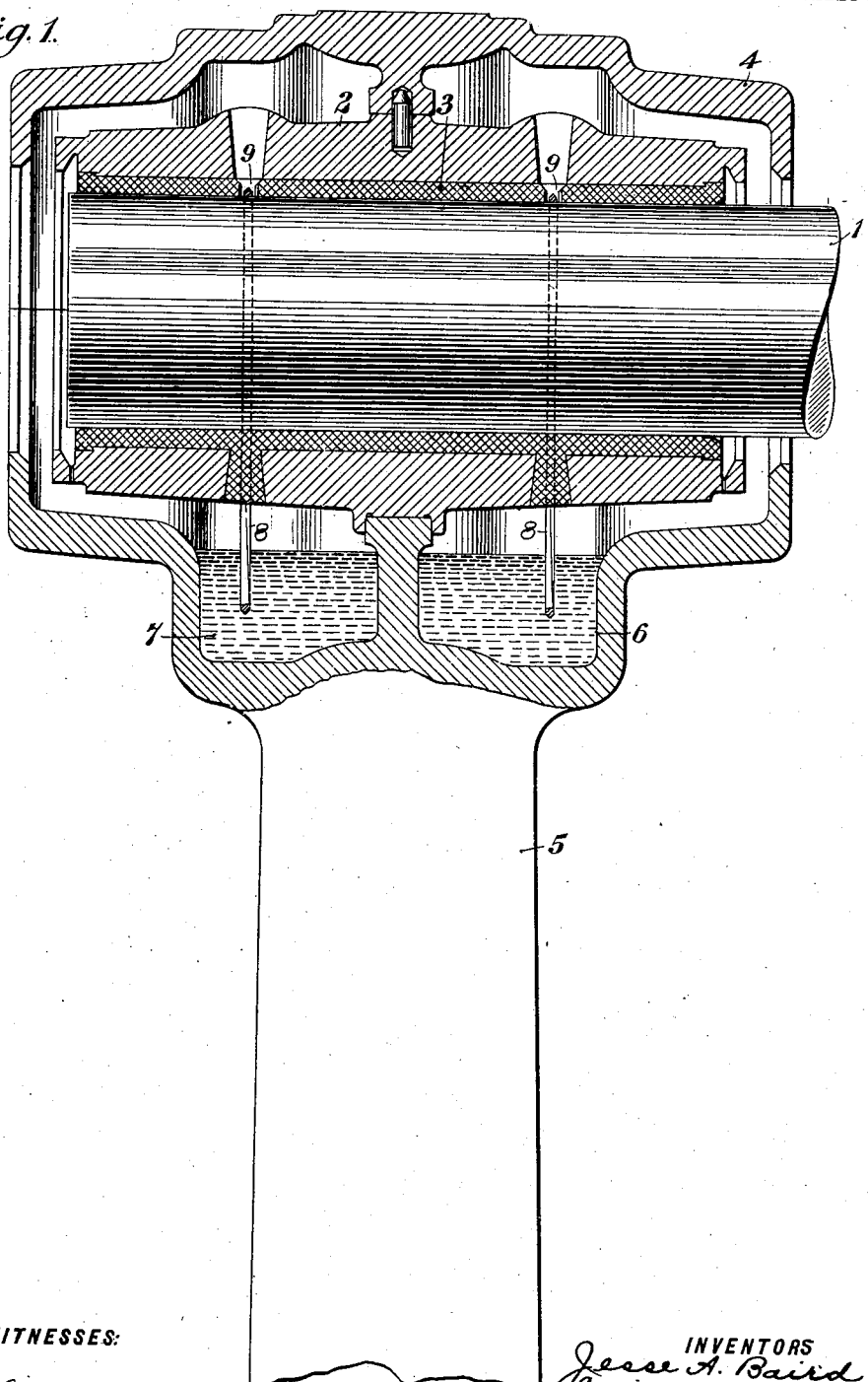

No. 740,075. PATENTED SEPT. 29, 1903.
J. A. BAIRD & E. O. H. H. SASS.
OIL DISTRIBUTING RING.
APPLICATION FILED SEPT. 29, 1902.
NO MODEL. 2 SHEETS—SHEET 1.

WITNESSES:
C. L. Belcher
J. C. Morse

INVENTORS
Jesse A. Baird
Emil O. H. H. Sass
BY
Isley G. Carr
ATTORNEY.

No. 740,075. PATENTED SEPT. 29, 1903.
J. A. BAIRD & E. O. H. H. SASS.
OIL DISTRIBUTING RING.
APPLICATION FILED SEPT. 29, 1902.
NO MODEL. 2 SHEETS—SHEET 2.
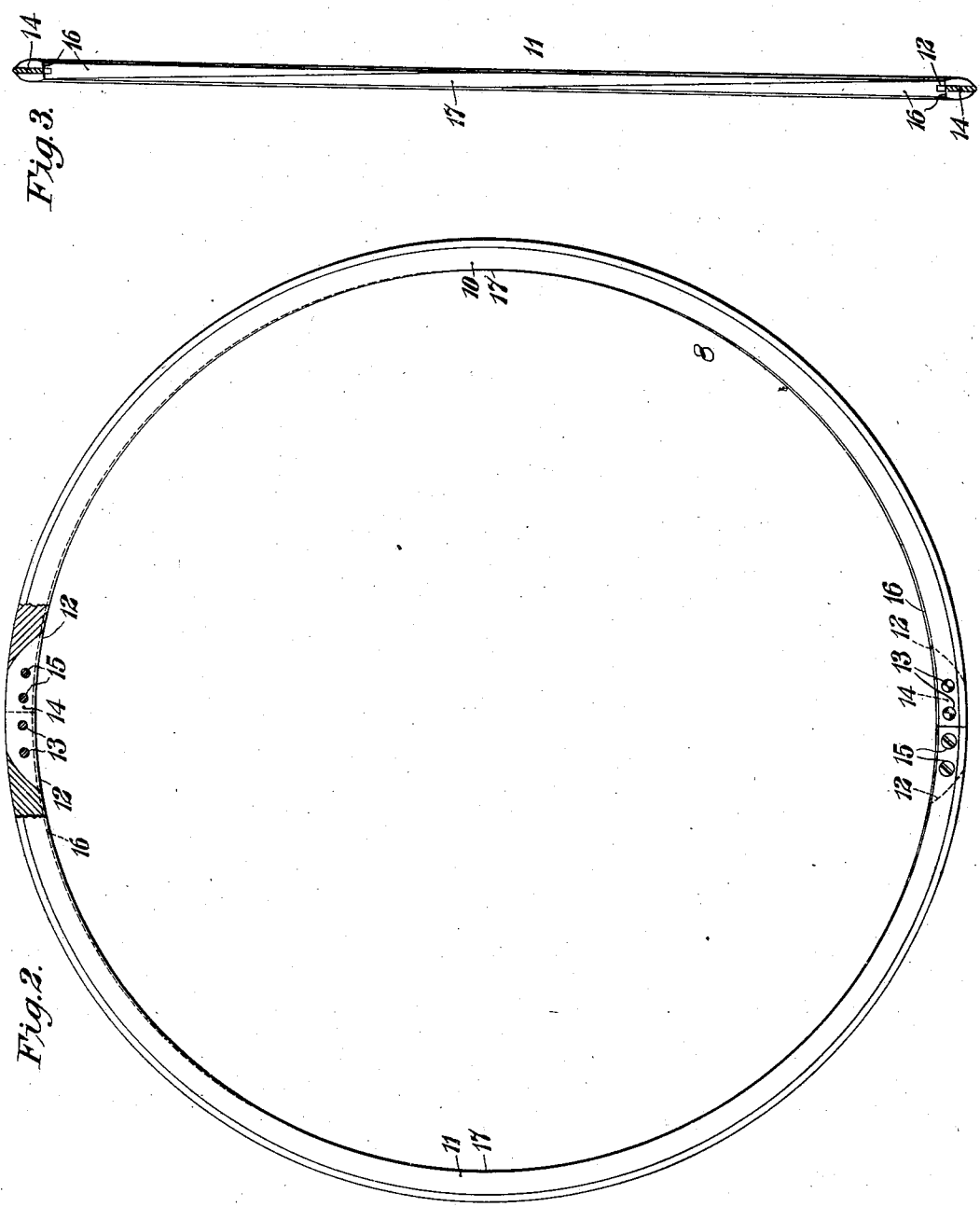

No. 740,075. Patented September 29, 1903.

UNITED STATES PATENT OFFICE.

JESSE A. BAIRD AND EMIL O. H. H. SASS, OF WILKINSBURG, PENNSYLVANIA, ASSIGNORS TO WESTINGHOUSE ELECTRIC & MANUFACTURING COMPANY, A CORPORATION OF PENNSYLVANIA.

OIL-DISTRIBUTING RING.

SPECIFICATION forming part of Letters Patent No. 740,075, dated September 29, 1903.

Application filed September 29, 1902. Serial No. 125,215. (No model.)

*To all whom it may concern:*

Be it known that we, JESSE A. BAIRD and EMIL O. H. H. SASS, citizens of the United States, and residents of Wilkinsburg, in the county of Allegheny and State of Pennsylvania, have invented a new and useful Improvement in Oil-Distributing Rings for Shafts, of which the following is a specification.

Our invention relates to means for automatically oiling machine-shafts and their bearings, and particularly to the rings employed for continuously applying the oil to the shafts.

The object of our invention is to provide a ring or set of rings which will automatically transfer oil from a reservoir or receptacle to the shaft of a machine and distribute it thereon more effectively than has been possible with the devices of this general character heretofore employed.

It has long been a usual practice to employ self-oiling bearings for the shafts of the rotating parts of machines, and such means has comprised a body of oil located in a suitable receptacle below the shaft-bearing and rings of greater diameter than the shaft, which rest thereon and dip into the body of oil, these rings being given a rotative movement by reason of the frictional engagement with the shaft, and thus serving to carry oil to the shaft and keep it and its bearing-boxes constantly lubricated. Our invention pertains to this type of apparatus and is illustrated in the accompanying drawings, in which—

Figure 1 is a longitudinal sectional view of a shaft-bearing, a portion of the supporting-pillar for the bearing and the shaft being shown in side elevation. Fig. 2 is a view, partially in end elevation and partially in section, of one of the oil-distributing rings constructed in accordance with our invention; and Fig. 3 is a diametrical sectional view of the ring shown in Fig. 2.

The shaft 1, one end of which is shown in Fig. 1, is mounted in a bearing-box 2, having a suitable Babbitt-metal lining 3, as is usual, and this box is in turn supported by and within a casing 4, which constitutes the upper end of a pillar or standard 5. These parts just described may obviously be varied materially from what is shown, and they do not of themselves embody our invention.

Within the bottom portion of the casing 4 is formed a receptacle 6, in which is contained a body of lubricating-oil 7, into which dip oil-distributing rings 8 of materially greater diameter than the shaft 1, the Babbitt-metal lining 3 being cut away at points 9, so that the rings may rest upon the shaft and be given rotative movement by reason of frictional contact therewith. A single ring or more than two may obviously be employed, if desired, in cases where the number here shown is not specially adapted to the requirements of the service.

As heretofore employed oil-registering rings have not varied from true annular contour, and their inner surfaces have been uniform, so that the motion imparted to the rings by reason of engagement with their shaft has been one of rotation only.

In accordance with our invention we first produce two semi-annular bodies 10 and 11 of the desired radius, the inner peripheries of which may be of uniform semicylindrical contour and the outer peripheries of which may have any contour desired, that indicated in the drawings being of V shape in cross-section; but this form is not essential to the operation of the device. The two halves 10 and 11 are then clamped together to form a ring, and in the meeting ends are cut slots 12. In one of the slots 12 of the part 11 is fastened, by means of rivets 13, a tongue 14, the projecting end of which is of such form and dimensions as to fit into the corresponding slot 12 in the part 10, and it is fastened into this slot by means of screws 15. In the same manner we fit a similar tongue 14 in the corresponding slot 12 of the part 10 and fasten it in position by means of rivets 13, so that its projecting end will fit into the corresponding slot in the part 11, and it is fastened into this part by means of screws 15, this construction being such as will permit of ready removal of the ring from the bearing when desired without disturbing any part of the same excepting the cap of the casing 4. The ring obviously might be made in more than two parts; but this would increase the complication and expense and would be unnecessary, and therefore not generally desirable. The ring being formed as above indicated is then clamped in a suitable boring-machine at an angle to the boring-tool and bored so as to form two semi-annular surfaces 16, which are angularly disposed with reference to the axis of the ring and gradually decrease in width from that of the entire thickness of the ring to substantially zero at the extremities of a diameter at right angles to the diameter of the widest parts of the surface. The ring is then clamped in such position that the boring-tool operates at substantially the same angle on the other side of the axis of the ring, and two surfaces 17 are formed, the maximum widths of which are located at the points where the surfaces 16 terminate and the minimum widths of which are located at the points where the surfaces 16 are of maximum width. We thus form angularly-disposed surfaces the meeting edges of which are sections of helices, and since the tendency of the ring is to rest with its widest surface upon the shaft which supports it the ring will be given a lateral or wabbling motion from side to side as it rotates by reason of the frictional engagement with the shaft. This lateral or wabbling motion causes the ring to more effectively take up oil from the receptacle 6 and to distribute it more efficiently upon the shaft than would be the case if the ring had a rotative motion only. This lateral or wabbling motion may of course be effected by making the ring of different formation than that which is specifically shown, and we therefore desire it to be understood that our invention is not limited to the specific form illustrated.

Any distortion of the ring which serves to provide a warped surface on the inner periphery or which would otherwise insure a material deviation from an annular rotative movement of the ring as a whole would serve in a greater or less degree to effect the result which we secure by the construction specifically illustrated, and it is therefore to be understood that our invention is to be given such interpretation as will include within the scope of our claims every substantial equivalent for effecting the same result.

We claim as our invention—

1. An oil-distributing ring for shafts having a plurality of inner surfaces which meet along curved lines the planes of which are angularly disposed with reference to the central plane of the ring.

2. An oil-distributing ring for shafts having an inner surface composed of semicylindrical surfaces angularly disposed with reference to each other.

3. An oil-distributing ring for shafts the inner surface of which comprises the surfaces of two cylinders the axes of which intersect at the center of the ring.

4. An oil-distributing ring for shafts the inner surface of which comprises a plurality of angularly-disposed surfaces the meeting edges of which are sections of helices.

5. An oil-distributing ring for shafts having an inner surface which varies from annular symmetry whereby frictional engagement between said surface and a rotating shaft imparts both rotative and lateral motion to said ring or some part or parts thereof.

6. An oil-distributing ring for shafts comprising a plurality of separable members and having an inner surface consisting of two cylindrical surfaces so disposed as to meet along helical lines.

7. An oil-distributing ring for shafts comprising a plurality of separable parts and having an inner surface consisting of two cylindrical surfaces the axes of which make acute angles with each other and with a line at right angles to the plane of the ring.

8. The combination with a shaft and a bearing therefor having an oil-containing receptacle, of an oil-distributing ring resting upon the shaft and comprising a plurality of separable parts and having an inner surface consisting of a plurality of divisions meeting along curved lines the planes of which make acute angles with the central plane of the ring whereby the ring is moved both rotatively and laterally through the oil in said receptacle.

9. The combination with a shaft and a bearing therefor having an oil-containing receptacle, of an oil-distributing ring having an inner surface comprising a plurality of cylindrical surfaces so disposed as to be separated by sections of helices and resting upon said shaft whereby rotation of the latter moves said ring both rotatively and laterally through the oil in said receptacle.

10. The combination with a shaft, of a bearing therefor having a receptacle containing oil and an oil-distributing ring resting upon said shaft and projecting into the oil in said receptacle and having a wabble-producing contour.

In testimony whereof we have hereunto subscribed our names this 26th day of September, 1902.

J. A. BAIRD.
EMIL O. H. H. SASS.

Witnesses:
JAMES B. YOUNG,
BIRNEY HINES.